United States Patent
Asanovic et al.

(10) Patent No.: US 11,429,392 B2
(45) Date of Patent: Aug. 30, 2022

(54) SECURE PREDICTORS FOR SPECULATIVE EXECUTION

(71) Applicant: SiFive, Inc., San Mateo, CA (US)

(72) Inventors: Krste Asanovic, Berkeley, CA (US); Andrew Waterman, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/362,121

(22) Filed: Mar. 22, 2019

(65) Prior Publication Data

US 2020/0210197 A1    Jul. 2, 2020

Related U.S. Application Data

(60) Provisional application No. 62/787,248, filed on Dec. 31, 2018.

(51) Int. Cl.
*G06F 9/38*    (2018.01)
*G06F 9/30*    (2018.01)

(52) U.S. Cl.
CPC ........ *G06F 9/3848* (2013.01); *G06F 9/30145* (2013.01); *G06F 9/3806* (2013.01)

(58) Field of Classification Search
CPC .... G06F 9/3806; G06F 9/3842; G06F 9/3848; G06F 21/556; G06F 9/30043; G06F 9/30145
See application file for complete search history.

(56) References Cited

U.S. PATENT DOCUMENTS

| | | | |
|---|---|---|---|
| 5,781,752 A | 7/1998 | Moshovos et al. | |
| 10,001,998 B2 | 6/2018 | Zhang et al. | |
| 2003/0182543 A1 | 9/2003 | Keller et al. | |
| 2009/0089564 A1* | 4/2009 | Brickell | G06F 9/3846 |
| | | | 712/239 |
| 2011/0289300 A1 | 11/2011 | Beaumont-Smith et al. | |

(Continued)

OTHER PUBLICATIONS

Dmitry Evtyushkin, Ryan Riley, Nael CSE and ECE Abu-Ghazaleh, and Dmitry Ponomarev. 2018. Branchscope: A New Side-Channel Attack on Directional Branch Predictor. SIGPLAN Not. 53, 2 (Feb. 2018), 693-707 (Year: 2018).*

(Continued)

*Primary Examiner* — Jyoti Mehta
*Assistant Examiner* — Kasim Alli

(57) ABSTRACT

Systems and methods are disclosed for secure predictors for speculative execution. Some implementations may eliminate or mitigate side-channel attacks, such as the Spectre-class of attacks, in a processor. For example, an integrated circuit (e.g., a processor) for executing instructions includes a predictor circuit that, when operating in a first mode, uses data stored in a set of predictor entries to generate predictions. For example, the integrated circuit may be configured to: detect a security domain transition for software being executed by the integrated circuit; responsive to the security domain transition, change a mode of the predictor circuit from the first mode to a second mode and invoke a reset of the set of predictor entries, wherein the second mode prevents the use of a first subset of the predictor entries of the set of predictor entries; and, after completion of the reset, change the mode back to the first mode.

28 Claims, 5 Drawing Sheets

(56) References Cited

U.S. PATENT DOCUMENTS

| | | | |
|---|---|---|---|
| 2014/0089647 A1 | 3/2014 | Kountanis et al. | |
| 2019/0042263 A1* | 2/2019 | Sukhomlinov | G06F 21/556 |
| 2019/0227804 A1* | 7/2019 | Mukherjee | G06F 9/3806 |
| 2019/0361707 A1* | 11/2019 | Vougioukas | G06F 9/30145 |

OTHER PUBLICATIONS

C. Carruth; "RFC: Speculative Load Hardening (a Spectre variant #1 mitigation)"; Mar. 23, 2018, 21 pages; https://lists.llvm.org/pipermail/llvm-dev/2018-March/122085.html.

C. Williams; "Three more data-leaking security holes found in Intel chips as designers swap security for speed" Aug. 14, 2018, pp. 1-12; https://www.theregister.co.uk/2018/08/14/intel_l1_terminal_fault_bugs/.

V. Kiriansky, et al.; "Speculative Buffer Overflows: Attacks and Defenses"; Jul. 10, 2018; pp. 1-12.

J. Renau; "Securing Processors from Time Side Channels"; UC Santa Cruz; Apr. 4, 2018; 20 pages; https://escholarship.org/uc/item/6j02r9pw.

K. Khasawneh, et al.; "SafeSpec: Banishing the Spectre of a Meltdown with Leakage-Free Speculation"; Jun. 16, 2018, 12 pages.

K. Asanovic; CS 152 Computer Architecture and Engineering; CS252 Graduate Computer Architecture; Lecture 13—Advanced Out-of-Order Superscalars and Introduction to VLIW; Electrical Engineering and Computer Sciences, University of California at Berkeley; 2018; 39 pages.

M. Yan, et al.; "InvisiSpec: Making Speculative Execution Invisible in the Cache Hierarchy"; 2018; 14 pages.

M. Schwarz, et al.; "NetSpectre: Read Arbitrary Memory over Network"; Jul. 2018; 14 pages.

V. Kiriansky, et al.; "DAWG: A Defense Against Cache Timing Attacks in Speculative Execution Processors"; 2018; 14 pages.

X. Dong, et al.; "Spectres, Virtual Ghosts, and Hardware Support"; HASP; Jun. 2, 2018; Los Angeles, CA; 9 pages.

G. Chen, et al.; "SGXPECTRE Attacks: Stealing Intel Secrets from SGX Enclaves via Speculative Execution"; Jun. 3, 2018; 16 pages.

C. Canella, et al.; "A Systematic Evaluation of Transient Execution Attacks and Defenses"; Nov. 13, 2018; 16 pages.

C. Celio, et al.; "Securing High-performance RISC-V Processors from Time Speculation"; Esperanto Technologies; 8th RISC-V Workshop, Barcelona, Spain; May 7, 2018; 29 pages.

International Search Report and Written Opinion for International Application No. PCT/US2019/067794 dated Mar. 10, 2020.

\* cited by examiner ical Field

This disclosure relates to secure predictors for speculative execution.

BACKGROUND

Side-channel attacks have been disclosed that rely on processor branch prediction and speculative execution. For Intel x86 processors, the first of these attacks were initially labeled Spectre, other variants or classes of these attacks exist. Briefly, these attacks rely on training branch predictor to execute code chosen by the attacker to load the target's secret data into the cache memory after processes/context and/or privilege level change. Target code used by the attacker may be code from the target process or from a shared library, so it is legal for the target process to execute the code. After the attacker process regains control of the processor, the attacker can measure the time it takes to read data from the same locations in the cache, thereby determining what target data is present in the cache, and hence determining the value of data in the target process. Mitigating these attacks is important for secure and reliable computing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
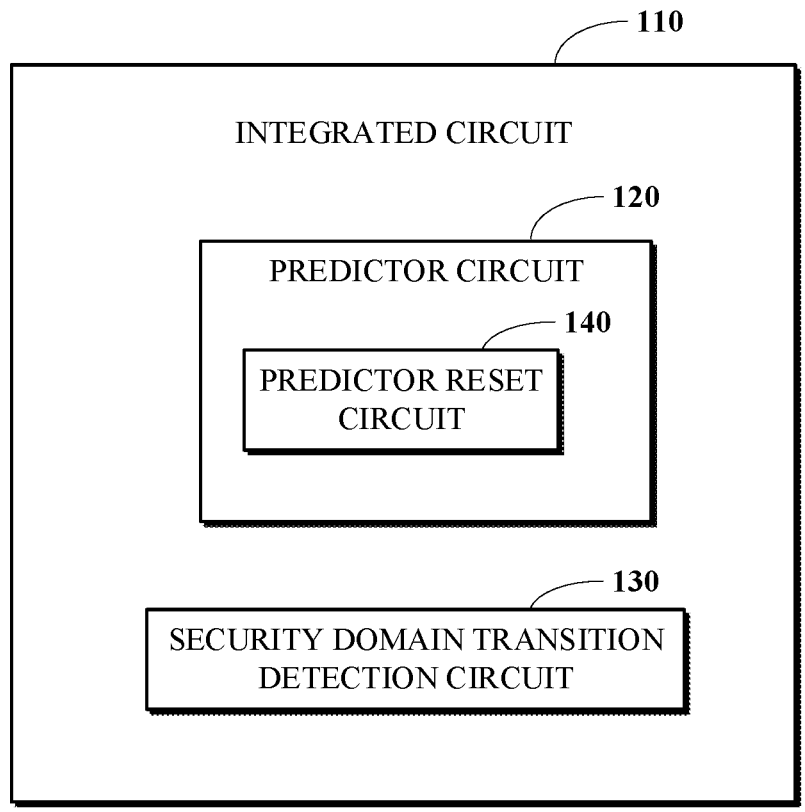
FIG. 1 is a block diagram of an example of an integrated circuit for executing instructions with secure prediction.

Disclosed herein are implementations of secure predictors for speculative execution. Some implementations may be used to eliminate or mitigate the possibility of side-channel attacks (e.g., Specter-class attacks) on a processor (e.g., CPUs such as x86, ARM, and/or RISC-V CPUs) more efficiently than previously known solutions.

Systems and methods for secure prediction are disclosed. An integrated circuit (e.g., a processor or microcontroller) may be configured to decode and execute instructions of an instruction set architecture (ISA) (e.g., a RISC V instruction set). The integrated circuit may implement a pipelined architecture. The integrated circuit may include a predictor circuit (e.g., a branch predictor) for improving performance by reducing delays in executing instructions in the pipelined architecture. The predictor circuit accesses prediction data arranged in entries that may be used to determine predictions for corresponding instructions.

An integrated circuit may be configured to detect when a security domain transition occurs for software being executed by the integrated circuit. For example, a security domain transition may be detected based on decoding an instruction associated with a security domain transition, either implicitly or explicitly. For example, a special instruction for indicating a security domain boundary in software may be used or existing instructions may be interpreted as causing a security domain transition. In some implementations, a security domain transition may be detected based on receiving an interrupt signal.

When a security domain transition is detected, the state of a predictor, including a set of predictor entries, may be reset to prevent data in the state from conveying information between security domains. Because the state of a predictor can be large and resetting the entire state can take multiple clock cycles to complete, the predictor may be configured to operate in one or more restricted modes that prevent the predictor from using predictor entries marked for reset to generate predictions during a time interval designated for the reset operation. For example, in a restricted mode, a predictor circuit may be disabled from generating predictions to facilitate speculative execution during the time interval of the reset. For example, in a restricted mode, a predictor circuit may be configured to generate static predictions that do not depend on predictor entries during the time interval of the reset. In some implementations, the predictor circuit may include a hybrid predictor that can generate predictions based on a subset of its predictor state. For example, in a restricted mode, a predictor circuit may be configured to generate predictions based on a subset of the predictor entries while a disjoint subset of the predictor entries is not available to be used while it is being reset. In some implementations, the duration of a time interval of the reset operation is fixed, which may provide benefits, such as preventing the leak of information via timing variations and/or preventing jitter (e.g., for real-time applications).

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the term "microarchitectural state" refers to a portion of the state (e.g., bits of data) of an integrated circuit (e.g., a processor or microcontroller) that is not directly accessible by software executed by the integrated circuit. For example, a microarchitectural state may include data stored in a cache and/or data stored by control-flow predictor that is used to make predictions about control-flow execution.

Details

FIG. 1 is block diagram of an example of an integrated circuit 110 for executing instructions with secure prediction. For example, the integrated circuit 110 may be a processor, a microprocessor, a microcontroller, or an IP core. The integrated circuit 110 includes a predictor circuit 120 and a security domain transition detection circuit 130. For example, the predictor circuit 120 may include a value predictor, a memory dependence predictor, a pre-fetch predictor, a control-flow predictor, a branch predictor, a branch-history table, a branch target buffer, and/or a return address stack predictor. For example, the predictor circuit 120 may be configured to, when operating in a first mode (e.g., a standard or normal mode), use data stored in one or more entries selected from any of a set of predictor entries to generate predictions used for speculative execution of instructions. For example, the security domain transition detection circuit 130 may detect when the integrated circuit 110 (e.g., a processor) does a context switch to a different process, or switches from user process to the operating system (kernel mode), or from operating system to virtual machine hypervisor (hypervisor mode). In some implementations, the security domain transition detection circuit 130 may detect a transition based on the decoding of an instruction that is, explicitly or implicitly, associated with transitions of the security domain. In some implementations, the security domain transition detection circuit 130 may detect a transition based on receiving an interrupt signal. The predictor circuit 120 includes a predictor reset circuit 140 that is configured to reset a state of the predictor circuit 120 when the security domain transition detection circuit 130 detects a security domain transition event. For example, a set of predictor entries may be entirely or partially stored in SRAM and may take multiple clock cycles to reset completely. While a reset operation is being performed, the predictor circuit 120 may be configured to avoid using some or all of the predictor state (e.g. a subset of the predictor entries) that are scheduled for reset. For example, during a time interval used to perform the reset, the predictor circuit 120 may disable prediction altogether, generate static predictions that do not depend on any predictor entries, or generate a prediction based on a subset of the set of predictor entries that have already been reset (e.g., a subset of the entries that are stored in flip-flops and can reset immediately upon detection of a security domain transition). For example, the predictor circuit 120 may include a hybrid predictor that can generate predictions using a subset of its predictor entries. In some implementations, the reset operation may be executed during a time interval of fixed duration, which may prevent the leak of information in the form of reset delays and prevent a source of jitter (e.g., to improve performance for real-time applications). For example, the predictor circuit 120 may be implemented as the predictor circuit 210 of FIG. 2. For example, the integrated circuit 110 may be used to implement to technique 400 of FIG. 4.

For example, the integrated circuit 110 may be configured to detect a security domain transition for software being executed by the integrated circuit 110 using the security domain transition detection circuit 130, and, responsive to the security domain transition, change a mode of the predictor circuit 120 from the first mode to a second mode and invoke a reset of the set of predictor entries by inputting a reset signal to the predictor reset circuit 140. The second mode may prevent the predictor circuit 120 from using at least a first subset of the predictor entries of the set of predictor entries to generate predictions. The integrated circuit 110 may be configured to, after completion of the predictor state reset, change the mode of the predictor circuit to the first mode to resume normal prediction. In some implementations, the integrated circuit 110 may be configured to, responsive to a partial completion of the reset, change the mode of predictor circuit 120 to a third mode that enables the predictor circuit 120 to use a second subset of the set predictor entries that have been reset while preventing use of a third subset of the set of predictor entries that have not yet been reset. The second subset and the third subset may be non-empty and disjoint subsets of the first subset. The integrated circuit 110 may be configured to generate a prediction based on a predictor entry in the second subset prior to completion of the reset. In some implementations, operating in the second mode prevents the predictor circuit 120 from generating predictions. In some implementations, operating in the second mode prevents the predictor circuit 120 from using all of the set of predictor entries and causes the predictor circuit 120 to generate a static prediction. In some implementations, operating in the second mode causes the predictor circuit 120 to generate a prediction based on a predictor entry in a second subset of the set of predictor entries that is disjoint from the first subset of predictor entries. For example, the predictor circuit 120, when operating in the first mode, may generate a prediction based on a combination of a prediction determined based on the second subset of the set of the predictor entries with one or more predictions based on one or more respective additional subsets of the set of predictor entries that are disjoint from the second set. In some implementations, security domain transition detection circuit 130 is configured to detect the security domain transition based on decoding an instruction associated with security domain transitions. In some implementations, security domain transition detection circuit 130 is configured to detect the security domain transition based on receiving an interrupt signal. In some implementations, a time interval between invoking the reset and changing the mode of the predictor circuit to the first mode has a fixed duration, which may prevent the leak of information via timing of reset operations and/or reduce or eliminate jitter.

Figure 2:
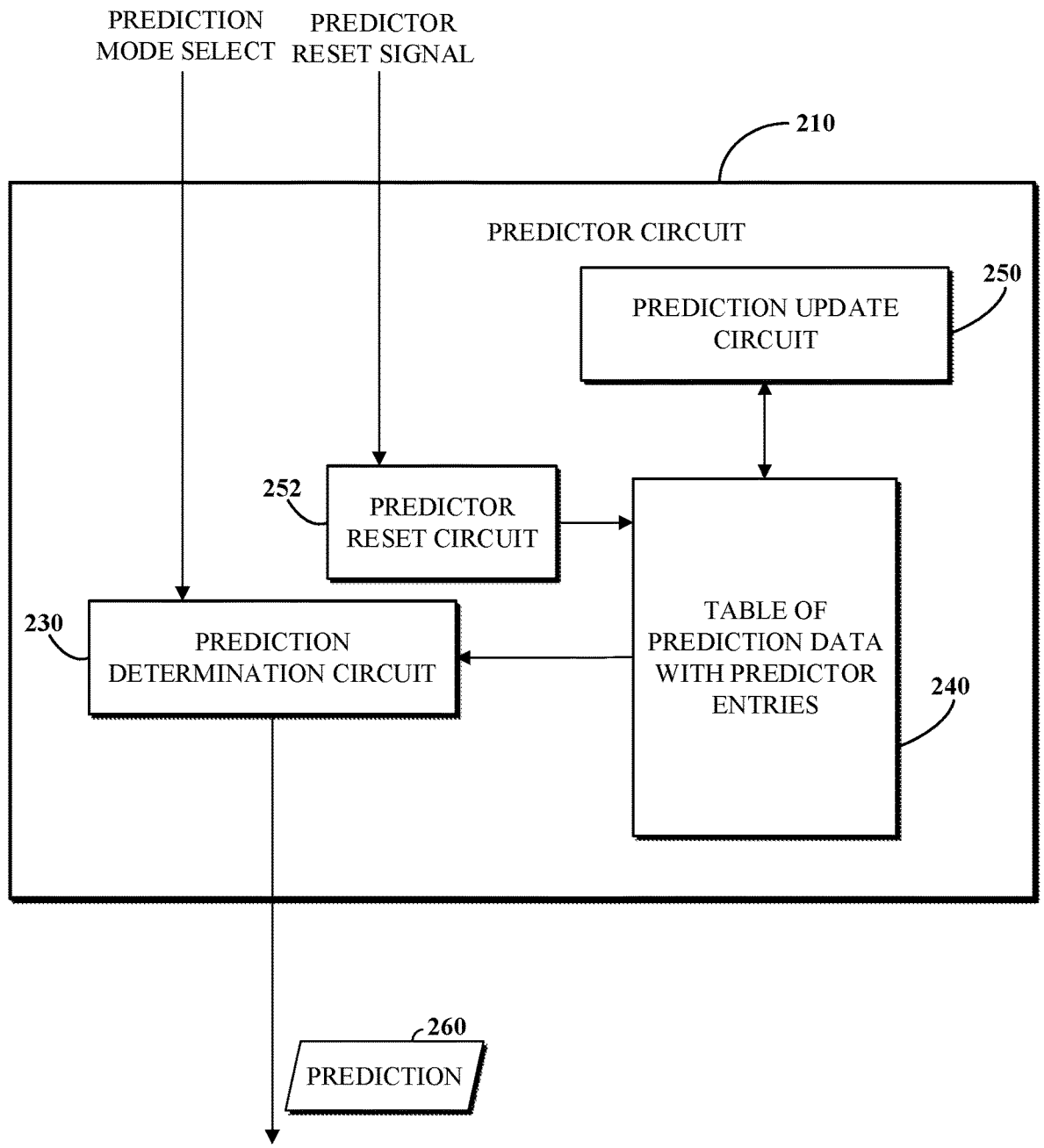
FIG. 2 is a block diagram of an example of a predictor circuit for secure prediction.

FIG. 2 is a block diagram of an example of a predictor circuit 210 for secure prediction. The predictor circuit 210 includes a prediction determination circuit 230; a table of prediction data 240 with predictor entries; a prediction update circuit 250, and a predictor reset circuit 252. For example, the prediction determination circuit 230 may be configured to determine a prediction 260 for an instruction (e.g., a branch prediction or a value prediction) based on data in an entry of the table of prediction data 240 corresponding to the subject instruction. However, when a security domain transition has been detected, a predictor reset signal may be input to the predictor circuit 210 to cause the predictor reset circuit 252 to perform a reset of predictor entries stored in the table of prediction data 240, and a prediction mode select signal may be input to the predictor circuit 210 to modify the way that the prediction determination circuit generates a prediction 260. For example, changing the mode of the predictor circuit 210 may cause the prediction 260 to be generated as a static prediction that does not depend on predictor entries in the table of prediction data 240 or prevent generation of the prediction 260. For example, changing the mode of the predictor circuit 210 may cause the prediction 260 to be generated with access to only a subset of the predictor entries (e.g., entries stored in flip-flops) in the table of prediction data 240 that have been reset in an early phase of the reset operation. For example, the predictor circuit 210 may be used in implementing the technique 400 of FIG. 4.

For example, the predictor circuit 210 may include a branch predictor and the prediction 260 may include a prediction of whether a subject branch instruction will be taken. For example, an entry of the table of prediction data 240 may include a respective counter (e.g., a two-bit saturating counter) reflecting the frequency at which a corresponding branch instruction has been taken in the recent past. In some implementations, the predictor circuit 210 includes a branch-history table. For example, an entry of the table of prediction data 240 may include a respective shift register reflecting the branching history of a corresponding branch instruction in the recent past. For example, entries of the table of prediction data 240 may be indexed by program counter. In a first mode (e.g., a standard or normal mode) the prediction determination circuit 230 may be configured to determine a prediction 260 for an instruction based on data in an entry of the table of prediction data 240 corresponding to the instruction. For example, the prediction 260 for a branch instruction may be "taken" if a saturating counter in a corresponding entry of the table of prediction data 240 is above a threshold. For example, in a second mode (e.g., a restricted reset mode), the prediction determination circuit 230 may be configured to determine a prediction 260 for an instruction as a static prediction. For example, in a second mode (e.g., a restricted reset mode), the prediction determination circuit 230 may be configured to determine a prediction 260 for an instruction based on data from a subset of the set of predictor entries that has been reset and in an early phase of a reset operation and is available for secure use.

The prediction update circuit 250 is configured to update the table of prediction data 240 after execution of an instruction. For example, when a branch instruction is taken, the prediction update circuit 250 may increment a saturating counter in an entry of the table of prediction data 240 corresponding to the branch instruction. For example, when a branch instruction is not taken, the prediction update circuit 250 may decrement a saturating counter in an entry of the table of prediction data 240 corresponding to the branch instruction.

The predictor reset circuit 252 may be configured to perform a reset operation on a set of predictor entries stored in the table of prediction data 240. For example, the predictor circuit may receive a predictor reset signal from a detector circuit when a security domain transition is detected, which may cause the predictor reset circuit 252 to initiate a reset of the predictor entries in the table of prediction data 240. For example, some or all of the predictor entries of the table of prediction data 240 may be stored in SRAM. Resetting (e.g., setting the entry values to zero or some other default or initial value) all the predictor entries may take multiple clock cycles. For example, complete reset operation may be carried out by the predictor reset circuit 252 during a time interval spanning multiple clock cycles. In some implementations, some of the predictor entries of the table of prediction data 240 may be stored in flip-flops or registers that can cleared or reset in a single clock cycle when the predictor reset signal is received. For example, a subset of the predictor entries stored in flip-flops may be cleared in the first clock cycle after a predictor reset signal is received, while another disjoint subset of the predictor entries that are stored in SRAM may be reset over the course of a longer time interval (e.g., with a sequence of writes to different portions of the SRAM).

Figure 3:
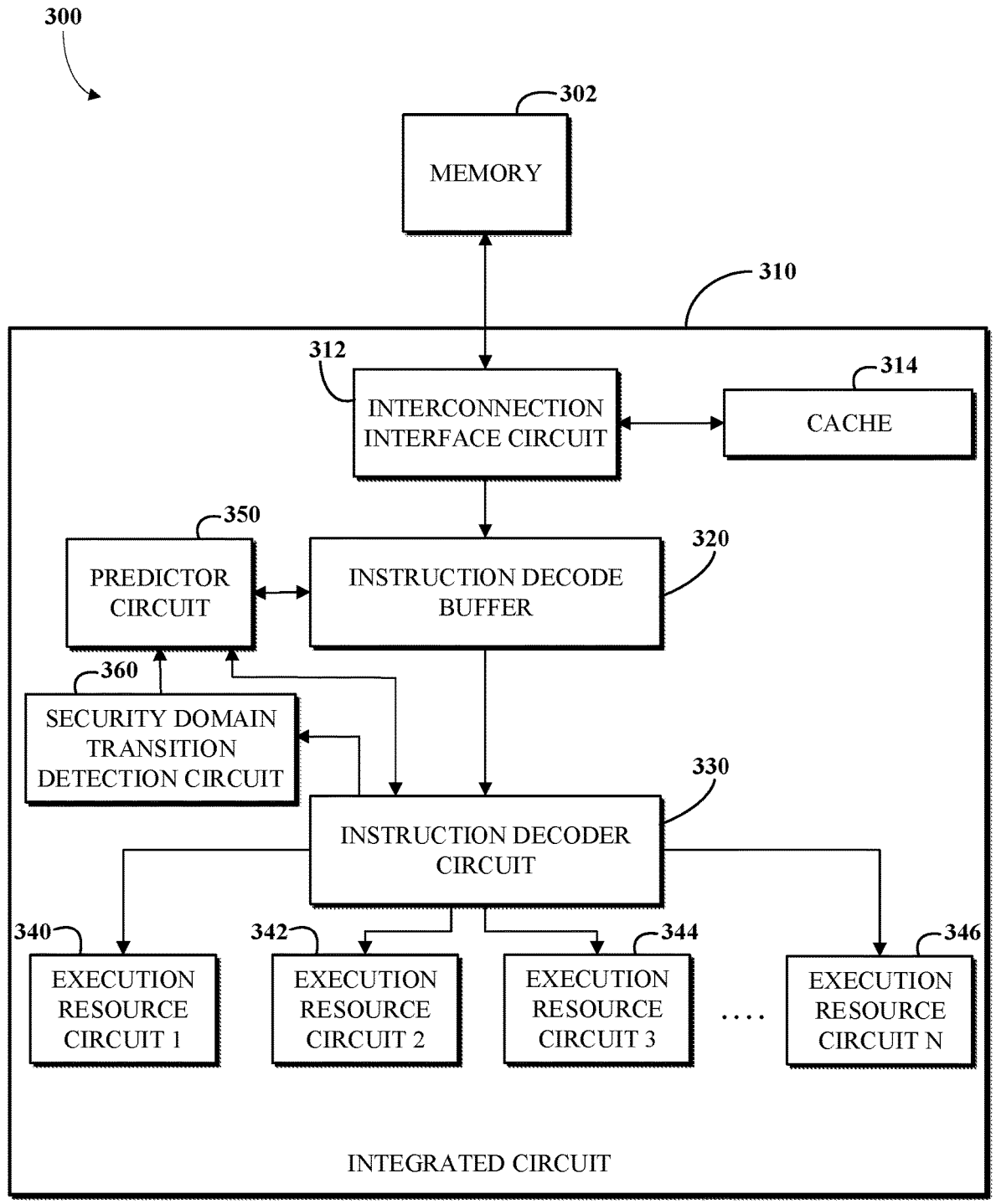
FIG. 3 is a block diagram of an example of a system for executing instructions with secure prediction.

FIG. 3 is a block diagram of an example of a system 300 for executing instructions with secure prediction. The system 300 includes a memory 302 storing instructions and an integrated circuit 310 configured to execute the instructions. For example, the integrated circuit 310 may be a processor, a microprocessor, a microcontroller, or an IP core. The integrated circuit 310 includes an interconnection interface circuit 312; a cache 314; an instruction decode buffer 320 configured to store instructions that have been fetched from the memory 302; an instruction decoder circuit 330 configured to decode instructions from the instruction decode buffer 320 and pass corresponding micro-ops to one or more execution resource circuits (340, 342, 344, and 346) for execution; a predictor circuit 350; and a security domain transition detection circuit 360. For example, the predictor circuit 350 may be implemented as the predictor circuit 210 of FIG. 2. For example, the integrated circuit 310 may be configured to implement the technique 400 of FIG. 4.

The interconnection interface circuit 312 (e.g., a bus interface circuit) is configured to transfer data to and from external devices including the memory 302. For example, the interconnection interface circuit 312 may be configured to fetch instructions from the memory 302 and store them in the instruction decode buffer 320 while the instructions are processed by a pipelined architecture of the integrated circuit 310. For example, the interconnection interface circuit 312 may be configured to write data resulting from the execution of instructions to the memory 302 during a write back phase of a pipeline. For example, the interconnection interface circuit 312 may fetch a block of data (e.g., instructions). The interconnection interface circuit 312 may be configured to use the cache 314 to optimize data transfers.

The integrated circuit 310 includes an instruction decode buffer 320 configured to store instructions fetched from memory 302 while they are decoded for execution. For example, the instruction decode buffer 320 may have a depth (e.g., 4, 8, 12, 16, or 24 instructions) that facilitates a pipelined and/or superscalar architecture of the integrated circuit 310. The instructions may be members of an instruction set (e.g., a RISC V instruction set, an x86 instruction set, an ARM instruction set, or a MIPS instruction set) supported by the integrated circuit 310.

The integrated circuit 310 includes one or more execution resource circuits (340, 342, 344, and 346) configured to execute instructions or micro-ops to support an instruction set. For example, the instruction set may be a RISC V instruction set. For example, the one or more execution resource circuits (340, 342, 344, and 346) may include an adder, a shifter (e.g., a barrel shifter), a multiplier, and/or a floating point unit. The one or more execution resource circuits (340, 342, 344, and 346) may update the state of the integrated circuit 310, including internal registers and/or flags or status bits (not explicitly shown in FIG. 3) and micro architectural state based on results of executing instructions. Results of execution of an instruction may also be written to the memory 302 (e.g., during subsequent stages of a pipelined execution).

The integrated circuit 310 includes an instruction decoder circuit 330 configured to decode the instructions in the instruction decode buffer 320. The instruction decode buffer 320 may convert the instructions into corresponding micro-ops that are internally executed by the integrated circuit 310 using the one or more execution resource circuits (340, 342, 344, and 346). The instruction decoder circuit 330 is configured to use predictions from the predictor circuit 350 to schedule instructions for execution and implement speculative execution.

The integrated circuit 310 includes a predictor circuit 350 configured to generate predictions to enable speculative execution. The predictor entries of the predictor circuit 350 may store data (e.g., a counter) used to determine predictions for an instruction (e.g., a branch instruction). For example, the predictor circuit 350 may include a value predictor, a memory dependence predictor, a pre-fetch predictor, a control-flow predictor, a branch predictor, a branch-history table, a branch target buffer, and/or a return address stack predictor. For example, the predictor circuit 350 may be configured to, when operating in a first mode (e.g., a standard or normal mode), use data stored in one or more entries selected from any of a set of predictor entries to generate predictions used for speculative execution of instructions. The predictor circuit 350 may support reset of the set of predictor entries, which may be invoked when a security domain transition occurs in software being executed by the integrated circuit 310 to prevent data of the predictor entries from being used as a side-channel for information leaks. Since a reset operation may take more than a single clock cycle to complete, the predictor circuit 350 may also support restrictive modes that prevent predictor entries that are scheduled for reset from being used during a time interval allotted for performing the reset operation. For example, the predictor circuit 350 may support a restrictive mode that disables the predictor circuit 350 and prevents the generation of predictions during a time interval allotted for reset of the predictor state. For example, the predictor circuit 350 may support a restrictive mode that causes the predictor circuit 350 to generate static predictions during a time interval allotted for reset of the predictor state. For example, the predictor circuit 350 may support a restrictive mode that causes the predictor circuit 350 to generate predictions using only a subset of the predictor entries that have been reset during an early phase of a reset operation. In some implementations, the predictor circuit 350 is a hybrid predictor that is configured to generate predictions based on one or more subsets of the set of predictor entries. For example, the predictor circuit 350 may combine predictions from multiple respective subsets of the predictor entries using a majority vote scheme, a fixed hierarchy or priority of the subsets, a meta-prediction that chooses amongst predictions from available subsets, or based on prediction confidence scores for the predictions generated using respective subsets. For example, these hybrid schemes may be used to determine reasonable predictions while portions of the set of predictor entries are unavailable during a reset operation.

The integrated circuit 310 includes a security domain transition circuit 360 that is configured to detect when software being executed by the integrated circuit 310 changes from one security domain to another. For example, the security domain transition detection circuit 360 may detect a transition when the integrated circuit 310 performs a context switch to a different process, or receives an interrupt, or switches from a user process to an operating system, or switches from an operating system to a virtual machine hypervisor. In some implementations, the security domain transition detection circuit 360 may detect the security domain transition based on decoding (e.g., using the instruction decoder circuit 330) an instruction associated with security domain transitions. The decoded instruction may be explicitly or implicitly associated with transitions of the security domain. For example, the decoded instruction may be a specialized instruction with the express purpose of signaling the software writer's intent to enforce a security domain boundary starting just before or just after the instruction. For example, the instruction may be a procedure call or a return instruction that it is implicitly associated with security domain transitions. In some implementations, the security domain transition detection circuit 360 may detect the security domain transition based on receiving an interrupt signal. When a security domain transition is detected, the security domain transition detection circuit 360 may issue a mode selection signal and/or a reset signal to the predictor circuit 350.

For example, the integrated circuit 310 may be configured to detect a security domain transition for software being executed by the integrated circuit 310 using the security domain transition detection circuit 360, and, responsive to the security domain transition, change a mode of the predictor circuit 350 from the first mode to a second mode and invoke a reset of the set of predictor entries. The second mode may prevent the predictor circuit 350 from using at least a first subset of the predictor entries of the set of predictor entries to generate predictions. The integrated circuit 310 may be configured to, after completion of the reset, change the mode of the predictor circuit to the first mode to resume normal prediction. In some implementations, the integrated circuit 310 may be configured to, responsive to a partial completion of the reset, change the mode of predictor circuit 350 to a third mode that enables the predictor circuit 350 to use a second subset of the set predictor entries that have been reset while preventing use of a third subset of the set of predictor entries that have not yet been reset. The second subset and the third subset may be non-empty and disjoint subsets of the first subset. The integrated circuit 310 may be configured to generate a prediction based on a predictor entry in the second subset prior to completion of the reset. In some implementations, operating in the second mode prevents the predictor circuit 350 from generating predictions. In some implementations, operating in the second mode prevents the predictor circuit 350 from using all of the set of predictor entries and causes the predictor circuit 350 to generate a static prediction. In some implementations, operating in the second mode causes the predictor circuit 350 to generate a prediction based on a predictor entry in a second subset of the set of predictor entries that is disjoint from the first subset of predictor entries. For example, the predictor circuit 350, when operating in the first mode, may generate a prediction based on a combination of a prediction determined based on the second subset of the set of the predictor entries with one or more predictions based on one or more respective additional subsets of the set of predictor entries that are disjoint from the second set. In some implementations, security domain transition detection circuit 360 is configured to detect the security domain transition based on decoding an instruction associated with security domain transitions. In some implementations, security domain transition detection circuit 360 is configured to detect the security domain transition based on receiving an interrupt signal. In some implementations, a time interval between invoking the reset and changing the mode of the predictor circuit to the first mode has a fixed duration, which may prevent the leak of information via timing of reset operations and/or reduce or eliminate jitter.

Figure 4:
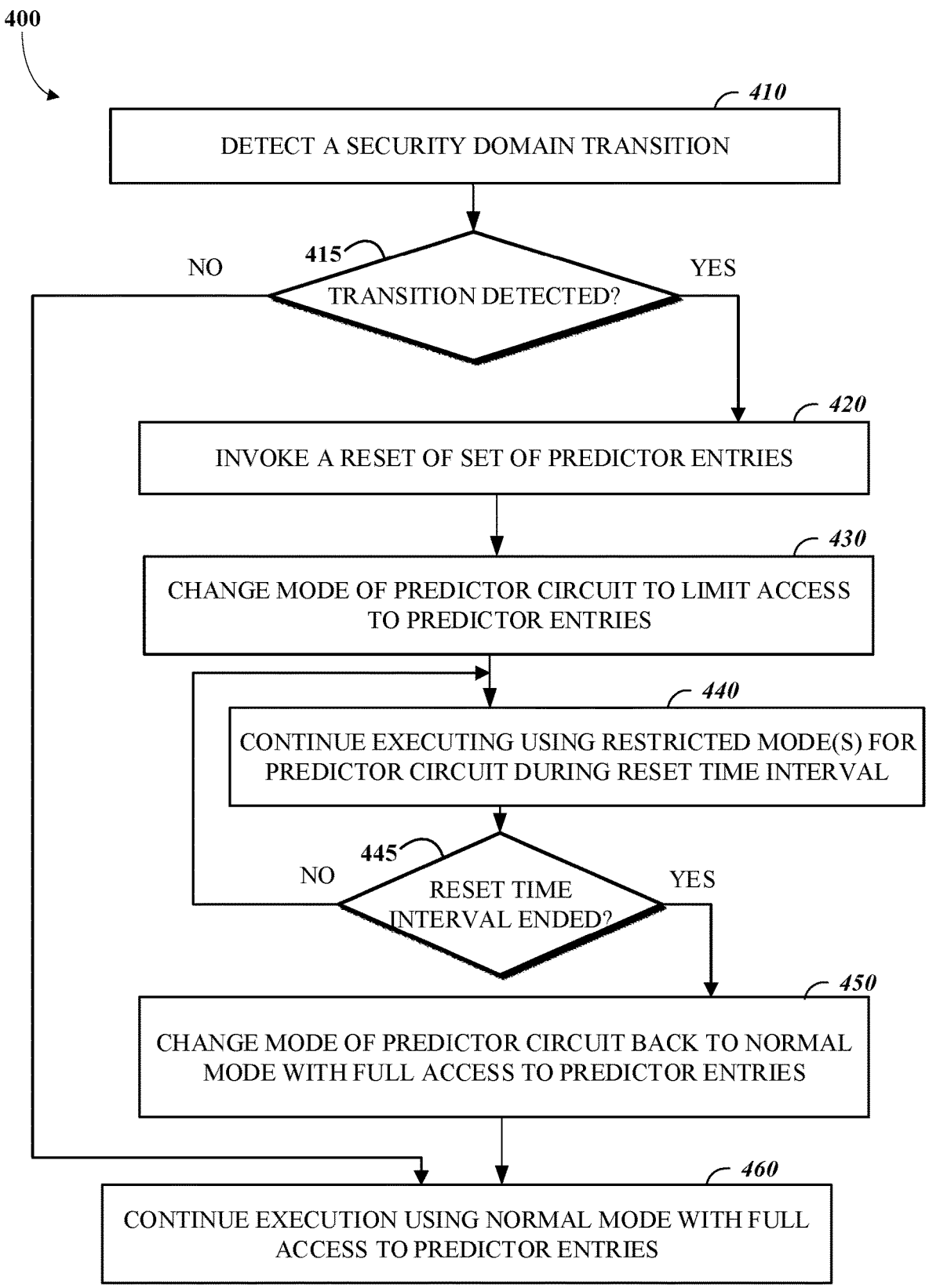
FIG. 4 is a flow chart of an example of a technique for executing instructions with secure prediction.

FIG. 4 is a flow chart of an example of a technique 400 for executing instructions with secure prediction. The technique 400 includes detecting 410 a security domain transition for software being executed by an integrated circuit; responsive to the security domain transition, invoking 420 a reset of the set of predictor entries and changing 430 a mode of the predictor circuit from the first mode to a second mode; continuing 440 execution in using one or more restricted modes for the predictor circuit that limit access to predictor entries during a reset time interval; and, after completion of the reset, changing 450 the mode of the predictor circuit to the first mode, and continuing 460 execution using the first mode with full access to predictor entries. For example, the predictor circuit may include a control-flow predictor, a value predictor, a branch predictor, a branch-history table, a branch target buffer, and/or a return address stack predictor. For example, the technique 400 may be implemented using the integrated circuit 110 of FIG. 1. For example, the technique 400 may be implemented using the predictor circuit 210 of FIG. 2. For example, the technique 400 may be implemented using the system 300 of FIG. 3.

The technique 400 includes detecting 410 a security domain transition for software being executed by an integrated circuit (e.g., the integrated circuit 310) that includes a predictor circuit configured to, when operating in a first mode (e.g., a standard of normal mode), use data stored in one or more entries selected from any of a set of predictor entries to generate predictions used for speculative execution of instructions. In some implementations, the security domain transition may be detected 410 based on decoding an instruction associated with security domain transitions. For example, a special instruction that can be used to explicitly indicate a security domain boundary in software may be decoded. For example, an instruction that serves another purpose (e.g., a procedure call or a return instruction) may be implicitly associated with security domain transitions, and a security domain transition may be detected 410 based on the decoding of one of these implicitly associated instructions. In some implementations, the security domain transition is detected 410 based on receiving an interrupt signal. For example, certain interrupts may be associated with security domain transitions or all interrupts may be associated with security domain transitions. In some implementations, the security domain transition is detected 410 based on decoding an instruction and also based on internal state of the integrated circuit (e.g., a processor) associated with security domain transitions. For example, the security domain transition may be detected 410 detected based on decoding or executing an exception-return instruction and based on a privilege mode of the destination having a value associated with security domain transitions, where the processor state records what privileged mode will be returned to.

When (at operation 415) a security domain transition has been detected, then the technique 400 includes, responsive to the security domain transition, changing 430 a mode of the predictor circuit from the first mode to a second mode and invoking 420 a reset of the set of predictor entries. The second mode may prevent the predictor circuit from using at least a first subset of the predictor entries of the set of predictor entries to generate predictions. For example, operating in the second mode may prevent the predictor circuit from generating predictions. For example, operating in the second mode may prevent the predictor circuit from using all of the set of predictor entries and may cause the predictor circuit to generate a static prediction. In some implementations, operating in the second mode causes the predictor circuit to generate a prediction based on a predictor entry in a second subset of the set of predictor entries that is disjoint from the first subset of predictor entries. For example, the predictor circuit may include a hybrid predictor that is capable of generating predictions based on one or more subsets of the predictor entries included in its predictor state. For example, the predictor circuit may combine predictions from multiple respective subsets of the predictor entries using a majority vote scheme, a fixed hierarchy or priority of the subsets, a meta-prediction that chooses amongst predictions from available subsets, or based on prediction confidence scores for the predictions generated using respective subsets. In normal mode, the predictor circuit may generate a prediction by combining predictions based on multiple subsets of the set of predictor entries. For example, the predictor circuit, when operating in the first mode, may generate a prediction based on a combination of a prediction determined based on the second subset of the set of the predictor entries with one or more predictions based on one or more respective additional subsets of the set of predictor entries that are disjoint from the second set. For example, in the second mode (e.g., a restrictive mode), the predictor circuit may be configured to determine a prediction based only on one or more subsets of the predictor entries as they become available during a reset operation.

The technique 400 includes continuing 440 execution in using one or more restricted modes for the predictor circuit that limit access to predictor entries during a reset time interval. For example, continuing 440 execution of instructions may include using predictions determined by the predictor circuit operating in the second mode to facilitate speculative execution. In some implementations, no predictions are generated by the predictor circuit while operating in the second mode and execution continues 440 without the benefit of speculative execution until the reset operation is completed. For example, the technique 500 of FIG. 5 may be implemented to utilize additional portions of the set of predictor entries as they become available to improve the performance of the predictor during the reset operation for continuing 440 speculative execution.

When (at operation 445) the reset is completed, then the technique 400 includes, after completion of the reset, changing 450 the mode of the predictor circuit to the first mode (e.g., a standard or normal mode). In some implementations, a time interval between invoking 420 the reset and changing 450 the mode of the predictor circuit to the first mode has a fixed duration. Constraining this time interval to have a fixed duration may provide benefits, such as prevent the leak of information across a security domain boundary in the form of timing information and/or preventing a source of jitter (e.g., for real-time applications).

Figure 5:
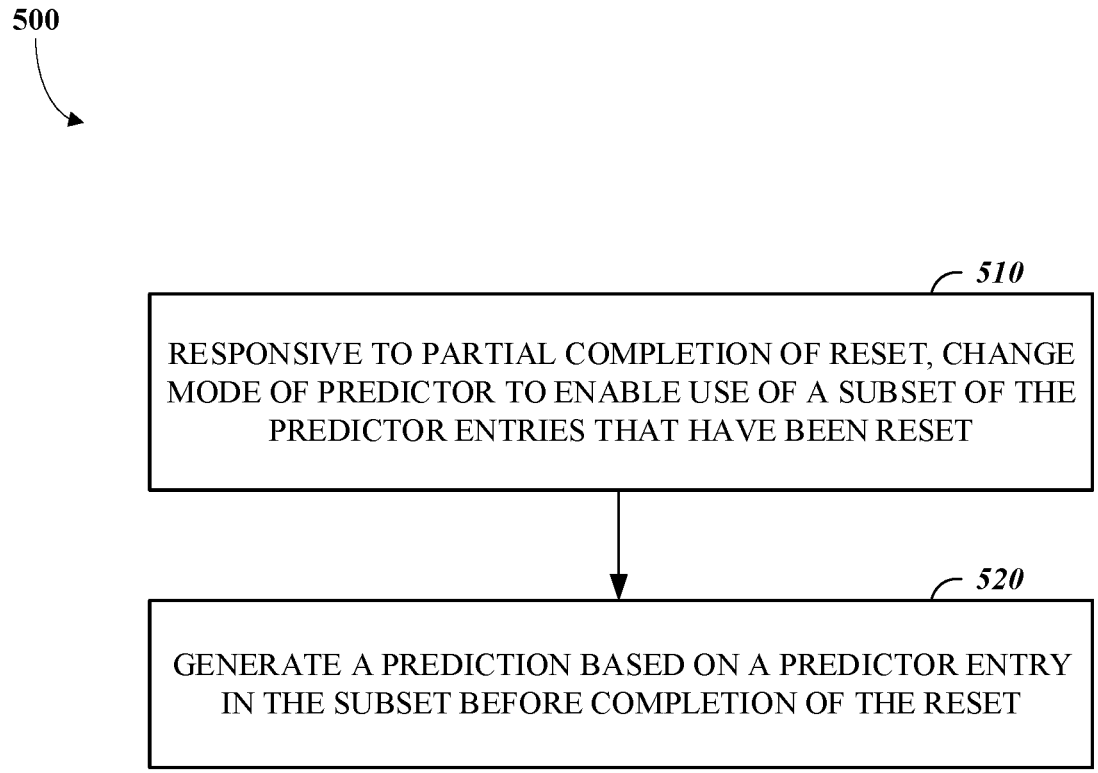
FIG. 5 is a flow chart of an example of a technique for executing instructions with prediction based on a subset of a set of predictor entries during a reset operation for the predictor.

After the mode of the predictor circuit has been changed 450 back to the first mode (e.g., a standard or normal mode), the technique 400 includes continuing 460 execution using the first mode with full access to predictor entries. After some time of continued 460 execution with prediction updates (e.g., using the prediction update circuit 250) the predictor state including the set of predictor entries may stabilize and converge to useful value tuned to the conditions within the new security domain. FIG. 5 is a flow chart of an example of a technique 500 for executing instructions with prediction based on a subset of a set of predictor entries during a reset operation for the predictor.

FIG. 5 is a flow chart of an example of a technique 500 for executing instructions with prediction based on a subset of a set of predictor entries during a reset operation for the predictor. The technique 500 includes, responsive to a partial completion of the reset, changing 510 the mode of predictor circuit to a third mode (e.g., an additional less restrictive mode) that enables the predictor circuit to use a second subset of the set predictor entries that have been reset while preventing use of a third subset of the set of predictor entries that have not yet been reset. The second subset and the third subset may be non-empty and disjoint subsets of the first subset. The technique 500 includes generating 520 a prediction based on a predictor entry in the second subset prior to completion of the reset. For example, the technique 500 may be used to utilize additional subsets of the predictor entries in a hybrid predictor as those subsets become available during a reset operation.

In a first aspect, the subject matter described in this specification can be embodied in integrated circuit for executing instructions that includes a predictor circuit configured to, when operating in a first mode, use data stored in one or more entries selected from any of a set of predictor entries to generate predictions used for speculative execution of instructions, wherein the integrated circuit is configured to: detect a security domain transition for software being executed by the integrated circuit; responsive to the security domain transition, change a mode of the predictor circuit from the first mode to a second mode and invoke a reset of the set of predictor entries, wherein the second mode prevents the predictor circuit from using at least a first subset of the predictor entries of the set of predictor entries to generate predictions; and, after completion of the reset, change the mode of the predictor circuit to the first mode.

In a second aspect, the subject matter described in this specification can be embodied in methods that include detecting a security domain transition for software being executed by an integrated circuit that includes a predictor circuit configured to, when operating in a first mode, use data stored in one or more entries selected from any of a set of predictor entries to generate predictions used for speculative execution of instructions; responsive to the security domain transition, changing a mode of the predictor circuit from the first mode to a second mode and invoking a reset of the set of predictor entries, wherein the second mode prevents the predictor circuit from using at least a first subset of the predictor entries of the set of predictor entries to generate predictions; and, after completion of the reset, changing the mode of the predictor circuit to the first mode.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit for executing instructions comprising:
    a predictor circuit configured to, when operating in a first mode, use data stored in one or more entries selected from any of a set of predictor entries to generate predictions used for speculative execution of instructions, wherein the integrated circuit is configured to:
        detect a security domain transition for software being executed by the integrated circuit;
        responsive to the security domain transition, change a mode of the predictor circuit from the first mode to a second mode and invoke a reset of the set of predictor entries, wherein the second mode prevents the predictor circuit from using at least a first subset of the predictor entries of the set of predictor entries to generate predictions;
        continue execution of one or more instructions using the second mode for the predictor circuit during at least a portion of a reset time interval, wherein the reset time interval is between invoking the reset and completion of the reset;
        responsive to a partial completion of the reset, change the mode of predictor circuit to a third mode that enables the predictor circuit to use a second subset of the set predictor entries that have been reset while preventing use of a third subset of the set of predictor entries that have not yet been reset, wherein the second subset and the third subset are non-empty and disjoint subsets of the first subset,
        generate a prediction based on a predictor entry in the second subset prior to completion of the reset; and
        after completion of the reset, change the mode of the predictor circuit to the first mode.

2. The integrated circuit of claim 1, in which operating in the second mode prevents the predictor circuit from generating predictions.

3. The integrated circuit of claim 1, in which operating in the second mode prevents the predictor circuit from using all of the set of predictor entries and causes the predictor circuit to generate a static prediction.

4. The integrated circuit of claim 1, in which operating in the second mode causes the predictor circuit to generate a prediction based on a predictor entry in a fourth subset of the set of predictor entries that is disjoint from the first subset of predictor entries.

5. The integrated circuit of claim 4, in which the predictor circuit, when operating in the first mode, generates a prediction based on a combination of a prediction determined based on the fourth subset of the set of the predictor entries with one or more predictions based on one or more respective additional subsets of the set of predictor entries that are disjoint from the fourth subset.

6. The integrated circuit of claim 1, in which the integrated circuit is configured to detect the security domain transition based on decoding an instruction associated with security domain transitions.

7. The integrated circuit of claim 6, in which the integrated circuit is configured to detect the security domain transition based on internal state of the integrated circuit associated with security domain transitions.

8. The integrated circuit of claim 1, in which the integrated circuit is configured to detect the security domain transition based on receiving an interrupt signal.

9. The integrated circuit of claim 1, in which a time interval between invoking the reset and changing the mode of the predictor circuit to the first mode has a fixed duration.

10. The integrated circuit of claim 1, in which the predictor circuit includes a control-flow predictor.

11. The integrated circuit of claim 1, in which the predictor circuit includes a value predictor.

12. The integrated circuit of claim 1, in which the predictor circuit includes a branch-history table.

13. The integrated circuit of claim 1, in which the predictor circuit includes a branch target buffer.

14. The integrated circuit of claim 1, in which the predictor circuit includes a return address stack predictor.

15. A method comprising:
    detecting a security domain transition for software being executed by an integrated circuit that includes a predictor circuit configured to, when operating in a first mode, use data stored in one or more entries selected from any of a set of predictor entries to generate predictions used for speculative execution of instructions;
    responsive to the security domain transition, changing a mode of the predictor circuit from the first mode to a second mode and invoking a reset of the set of predictor entries, wherein the second mode prevents the predictor circuit from using at least a first subset of the predictor entries of the set of predictor entries to generate predictions;
    continuing execution of one or more instructions using the second mode for the predictor circuit during at least a portion of a reset time interval, wherein the reset time interval is between invoking the reset and completion of the reset;
    responsive to a partial completion of the reset, changing the mode of predictor circuit to a third mode that enables the predictor circuit to use a second subset of the set predictor entries that have been reset while preventing use of a third subset of the set of predictor entries that have not yet been reset, wherein the second subset and the third subset are non-empty and disjoint subsets of the first subset;

generating a prediction based on a predictor entry in the second subset prior to completion of the reset; and after completion of the reset, changing the mode of the predictor circuit to the first mode.

16. The method of claim 15, in which operating in the second mode prevents the predictor circuit from generating predictions.

17. The method of claim 15, in which operating in the second mode prevents the predictor circuit from using all of the set of predictor entries and causes the predictor circuit to generate a static prediction.

18. The method of claim 15, in which operating in the second mode causes the predictor circuit to generate a prediction based on a predictor entry in a subset of the set of predictor entries that is disjoint from the first subset of predictor entries.

19. The method of claim 18, in which the predictor circuit, when operating in the first mode, generates a prediction based on a combination of a prediction determined based on the subset of the fourth set of the predictor entries with one or more predictions based on one or more respective additional subsets of the set of predictor entries that are disjoint from the fourth subset.

20. The method of claim 15, in which the security domain transition is detected based on decoding an instruction associated with security domain transitions.

21. The method of claim 20, in which the security domain transition is detected based on internal state of the integrated circuit associated with security domain transitions.

22. The method of claim 15, in which the security domain transition is detected based on receiving an interrupt signal.

23. The method of claim 15, in which a time interval between invoking the reset and changing the mode of the predictor circuit to the first mode has a fixed duration.

24. The method of claim 15, in which the predictor circuit includes a control-flow predictor.

25. The method of claim 15, in which the predictor circuit includes a value predictor.

26. The method of claim 15, in which the predictor circuit includes a branch-history table.

27. The method of claim 15, in which the predictor circuit includes a branch target buffer.

28. The method of claim 15, in which the predictor circuit includes a return address stack predictor.

* * * * *